May 21, 1957
A. F. SHERIDAN
2,792,839
CORN CUTTER HEAD
Filed Sept. 1, 1955
2 Sheets-Sheet 2
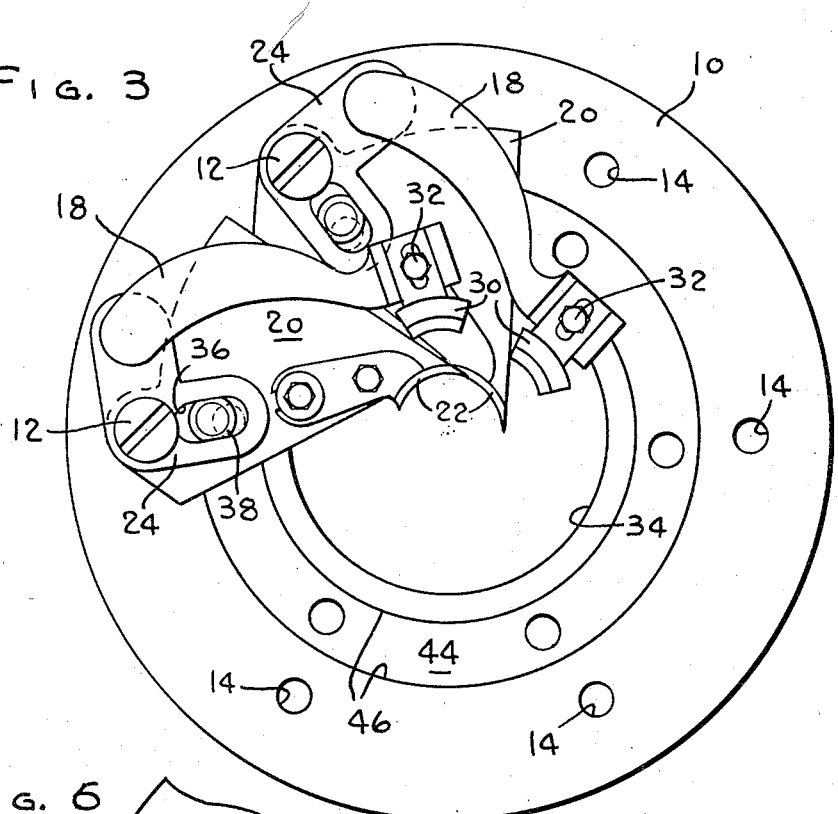
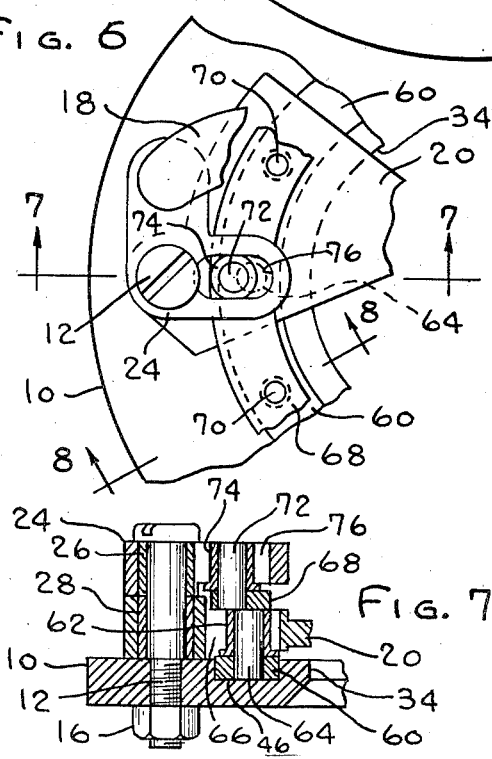
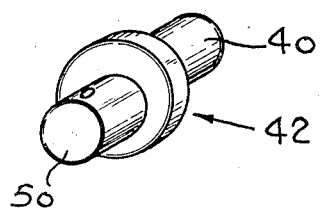
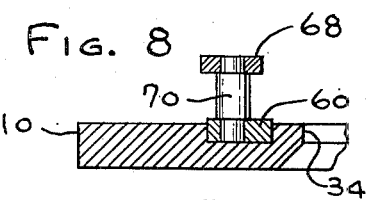
INVENTOR.
ALBERT F. SHERIDAN
BY
John W. Michael
ATTORNEY

United States Patent Office 2,792,839
Patented May 21, 1957

2,792,839

CORN CUTTER HEAD

Albert F. Sheridan, Manitowoc, Wis., assignor to Schultz-Sweetman-Sheridan, Inc., Manitowoc, Wis., a corporation of Wisconsin Application September 1, 1955, Serial No. 531,894

7 Claims. (Cl. 130—9)

This invention relates to a corn cutter head which automatically increases the depth of cut as the size of the cob going through the cutter head increases.

This invention is an improvement on the type cutter head shown in Cover Patents Nos. 2,141,346 and 2,216,065. In the Cover cutter head the depth of cut is fixed prior to placing the machine in operation. The cutter head itself is adapted to handle a range of cobs automatically in that it will adjust to the diameter of the cob going through the cutter head. However, the depth of cut always remains the same. When used in a canning plant, a number of machines are employed and the operators are instructed to use cobs only within a selected size range. The usual method is to have a conveyor carrying the cobs past the machines and the operators on the machines take the smallest cobs passing their station. Thus, the last machine will get the largest cobs. The necessity for selection in this manner is obviously subject to considerable objection since the operator closest to the source of supply, even though taking the smallest cobs, may be taking cobs larger than desirable for the shallow depth of cut set on the first machine. Thus, not enough of the kernel is cut from the cob. Similarly, if a batch of small cobs runs through the conveyor, the operators on the first machines will find it impossible to take off all the small cobs due to the rate of movement of the cobs past the machines. Therefore, the last machine will be taking a lot of small cobs which would then be cut to a greater depth than desirable.

The object of this invention is to provide a machine of the type described which will automatically adjust to the cob and will vary the depth of cut in accordance with the size of the cob. This eliminates the necessity for the operators selecting cobs and they need only to take cobs from the conveyor as rapidly as possible to feed the machine. As a result of use of this type of head, a considerable saving in labor can be effected since fewer people are required to feed each machine. Furthermore, a superior cut is obtained since it is always at the proper depth for the size of cob.

Other objects and advantages will be pointed out in, or be apparent from, the specification and claims, as will obvious modifications of the single embodiment shown in the drawings in which:

Fig. 1 is an elevation of a cutter head fitted with four of the six cutter blade and gage assemblies normally used on the head;

Fig. 2 is a section taken as indicated by line 2—2 on Fig. 1;

Fig. 3 is a view similar to Fig. 1 but shows the blades moved further out for a larger diameter cob. In both Figs. 1 and 3 the gage is spaced an unusually great distance from the blade in order to facilitate showing the construction. Obviously a cut of such depth would not be taken;

Fig. 4 is a prospective view of the offset pin employed in the construction previously described;

Fig. 5 is a layout illustrating the manner in which the depth is increased by the construction illustrated;

Fig. 6 is a view similar to Figs. 1 and 3 but employs a modified construction;

Fig. 7 is a section taken as indicated by line 7—7 on Fig. 6; and

Fig. 8 is a section taken as indicated by line 8—8 on Fig. 6.

The cutter head includes head plate 10 on which equally spaced studs 12 are mounted as shown with the threaded portion of the stud passing through the cooperating holes 14 and nut 16 retains the stud on the head plate. The stud serves as a common pivot point for the gage arm 18 and the generally triangular plate 20 which carries the blade 22. Each gage arm has a base portion 24 which is generally L-shaped in plan and is mounted on a bushing 26 on the stud 12. The triangular plate 20 is also provided with a bushing 28 and mounted on stud 12. Gage 30 is adjustably mounted on the outer end of arm 18 by means of bolt 32 and is the first part of the apparatus to be contacted by a cob moving towards the following blade. When a cob approaches the gage 30 to pass through the central aperture 34 in the head plate 10, the gage 30 will be forced out away from the center of the aperture 30 to an extent determined by the diameter of the cob. As the gage 30 moves outwardly the arm 18 rotates about pivot 12. This in turn causes the slot 36 in the base of arm 18 to drive the bushing 38 mounted on the upper part 40 of the offset pin 42. The pin 42 is offset as shown in Figs. 2 and 4 and is mounted in ring 44 which is rotatably mounted in an annular channel 46 in the forward face of the head plate 10. The offset pin 42 is connected to the ring 44 by pin 48 to hold the offset pin in the proper position with respect to the ring 44.

Not shown in these drawings are the springs acting on the ring to pull the ring counterclockwise (Fig. 1) to move the gages towards the center. This construction may be seen in the Cover patents and is not necessary to understanding the present invention. Similarly, limit stops may be employed, if desired.

As the arm 18 moves outwardly to drive the upper part 40 of the offset pin 42, it will be apparent that ring 44 must rotate in the annular channel 46. This rotation will be in a clockwise direction as viewed in Fig. 1. The lower part 50 of the offset pin 42 is provided with a bushing 52 which engages a slot 54 in the triangular plate 20. Since the axis of the upper portion 40 of the offset pin 42 is further from the center of the ring 44 and the axis of the feed aperture 34 than is the axis of the lower part 50 of the offset pin, the angular movement imparted to the triangular plate will be less than that of the gage arm 18. This is illustrated in Fig. 5 where the point A may be taken as corresponding to the pivot point 12. The point B can be taken as representing the starting point of both the gage and the blade at the center of the ring 44. In practice the gage and the blade would not move into the center but this can be used for convenience of illustration. Under the named conditions the center line of the upper pin 40 of offset pin 42 would be at point C while the center line of the lower pin 50 would be at point D. Points C and D must, due to their connection to ring 44, travel in arcs about point B (the center of the ring). Now then, if the gage 30 is moved to point E while rotating about point A, the new position for the axis of upper pin 40 will be at point F (where an arc about B and through C intersects a line from A to E). This movement forces the axis of pin 50 to move in an arc about point B. Since the lower pin 50 is rigidly interconnected to the upper pin 40, the new location of point B is determined by drawing a line from point F to point B and striking an arc through the point D to intersect the line from F to B. This point is illustrated as point G. Since the blade is movable in an arc about point A, it will now occupy the position determined by a line from A through G to intersect the arc which passes through B using point A as a center. The new location of the blade is shown as point H. The distance between E and H represents the depth of cut which would be obtained under the described conditions. It will be appreciated, however, that the depth can be varied either by shifting the position of blade 22 with respect to plate 20 or by moving gage 30 with respect to gage arm 18. With this arrangement the depth of cut can be preselected for a given size cob and thereafter the depth will be increased or decreased when handling larger or smaller cobs.

The manner in which the distance between the blades and the gages increases as the gages are moved outwardly is illustrated by comparison of Figs. 1 and 3. In Fig. 3 the gage arms have been moved outwardly from their innermost position. The depth of cut illustrated in Fig. 3 is, of course, quite extreme, but by separating the elements, that is the gage and the blade, it is rather easy to illustrate the structure involved in this invention. In practice, however, such an extremely deep cut would not be taken.

The follower gage 56 is well known in this art and is shown and described in the above Cover patents. At this point it is only necessary to mention that this follower gage modifies the depth of cut selected by the leading gage 30 when the kernels are extremely tough. Thus, the follower gage will move the blade further out than dictated by the leading gage 30 when the follower gage rides up on tough kernel stubs.

Figs. 6, 7 and 8 show a modified construction which does not require the use of the offset pin. In this arrangement the ring 60 carries bushing 62 on pin 64 to act on slot 66 in the triangular plate 20 to control rotational movement of the plate 20 and blade 22 about the pivot 12. Rather than employ the offset pin, another ring 68 of larger diameter is connected by pins 70 to the lower ring 60 and carries upper pins 72 having bushings 74 engaging slots 76 in the base 24 of gage arm 18. By this simple expedient the offset pins are avoided without sacrificing the idea of restricting the blade movement to less than that of the gage so that the depth of cut will be increased as the cob diameter is increased.

In the Cover patents mentioned above a single ring is used to insure equal movement of all blades as the various gages are moved outwardly by the cobs passing through the cutter head. The blade arm 18 and the triangular plate 20 move about the pivot 12 as a unit rather than having a differential movement. It is in the provision of this differential movement that the present invention lies since the differential provides the greater or lesser depth of cut in accordance with the diameter of the cobs being cut.

Other methods of obtaining the unequal movement between the gage and the blade will occur to those skilled in the art. The present construction is preferred since the interconnection of the blades and gages through the common ring insures uniform movement of all blades and gages. The present invention is not to be limited to the illustrated and preferred structure but is to be limited only by the scope of the claims.

I claim:

1. Corn cutting apparatus comprising, a support having a feed aperture through which the corn to be cut is fed in the direction of the axis of the cobs, a pivot on said support, a gage arm mounted on said pivot, an arcuate blade mounted on said pivot, means interconnecting the arm and the blade so the blade is rotated about the pivot as the gage is rotated about the pivot, said interconnecting means including means for imparting a smaller angular movement to the blade than the gage arm.

2. Corn cutting apparatus comprising, a support having a feed aperture through which the corn to be cut is fed in the direction of the axis of the cobs, a plurality of spaced pivots mounted on the support about the aperture, a gage arm pivotally mounted on each pivot and having a gage mounted thereon, a blade pivotally mounted on each pivot, means connecting each gage arm to the blade mounted on the same pivot to transmit angular movement of the gage arm to the blade and including means for reducing the angular movement imparted to the blade so the angular movement of the blade is less than the angular movement of the gage arm.

3. Apparatus according to claim 2 including means interconnecting all the gage arms and all the blades so all the arms have equal angular movement and all the blades have equal angular movement.

4. Apparatus according to claim 2 in which the connecting means includes an interconnecting member having one connection between one part thereof and the gage arm and another connection between another part thereof and the blade, at least one of the connections providing for relative motion whereby each connection may follow a curved path.

5. Apparatus according to claim 4 in which both of said connections provide for relative motion and the curved paths are concentric arcs.

6. Apparatus according to claim 2 in which the connecting means comprises an annulus mounted on the support for rotation about the axis of said aperture, each gage arm and each blade being connected to the annulus by means permitting relative movement between the annulus and the arms and between the annulus and the blades.

7. Apparatus according to claim 6 in which the last named means comprises slots in the arms and blades and pins projecting from the annulus into the slots, the pins being arranged concentrically about said aperture axis and the pins connected to the slots in the blades being closer to the aperture axis than the pins engaging the slots in the gage arms.

References Cited in the file of this patent
UNITED STATES PATENTS

| | | |
|---|---|---|
| 2,216,065 | Cover | Sept. 24, 1940 |
| 2,568,947 | Carroll | Sept. 25, 1951 |